Patented July 12, 1949

2,476,065

UNITED STATES PATENT OFFICE 2,476,065

MODIFIED UREA-FORMALDEHYDE RESINS

Jack D. Robinson, Greenwich, Conn., assignor to Wingfoot Corporation, Akron, Ohio, a corporation of Delaware No Drawing. Application December 7, 1946, Serial No. 714,915

8 Claims. (Cl. 260—45.2)

This invention relates to a modified amide-aldehyde condensation resin having unusual properties, and more particularly to a modified urea-formaldehyde resin.

The amide-aldehyde resins, more often referred to as the urea-formaldehyde type resins, have wide use in industry by reason of their adaptability to practically all methods of fabrication; they may be cast as liquids, molded from powders, or shaped from solid masses by the influence of heat and pressure. Because of their normal colorless state, they may be prepared in transparent form or with white or any other light-colored pigmentation. The principal objections to the universal use of urea-formaldehyde type resins lies in their brittleness and the lack of adequate resistance to water. These objections seriously limit the number of commercial applications of the amide-aldehyde condensation polymers.

Although attempts have been made to plasticize amide-aldehyde condensation resins by the addition of substances, such as sugar, glycol, and glycerol, the results achieved have not been entirely satisfactory. The slight plasticizing effect, which does moderately improve the brittleness, is achieved only at the expense of tensile strength, and since the normal tensile strength is not outstanding, this loss of strength is a serious detriment for most uses.

The principal purpose of this invention is to provide a new class of condensation polymers similar to the urea-aldehyde condensation resins in most of their physical properties, but which do not have the objectionable brittleness referred to, and in which the water absorption is greatly minimized. A further purpose is to provide new resins which are more stable in the intermediate liquid stage, and therefore do not gel upon standing as do the conventional amide-aldehyde resins.

The new condensation polymers are prepared by methods very similar to those used for the preparation of conventional urea-formaldehyde type resins except that the condensation is conducted in the presence of a substantial proportion of acrylonitrile or methacrylonitrile. Like the conventional urea-formaldehyde type of resins the amide is condensed with from 1.25 to 4 molecular equivalents of an aldehyde, but, in this invention, the condensation also includes from 0.25 to 1.75 molecular equivalents of the unsaturated nitrile. In the preparation of the preferred condensation products, between 1.5 and 3 molecular equivalents of the aldehyde are used for each molecular equivalent of the amide, and condensation takes place in the presence of from 0.5 to 1.5 molecular equivalents of either acrylonitrile or methacrylonitrile.

Although the principal amide for use in the practice of this invention is urea, other similar diamides, such as thiourea, guanidine, methylol-urea, dimethylol-urea, and the amides of dicarboxylic acids may also be used. A wide variety of aldehydes may be used in preparing the new condensation resins, for example, acetaldehyde, acrolein, benzaldehyde, and butyraldehyde, but formaldehyde is the best and most economical aldehyde available.

Like the conventional urea-formaldehyde type resins, the new condensation products are prepared in aqueous medium by mixing an aqueous solution of the aldehyde with the amide, preferably a water-soluble amide, and the nitrile which is also water-miscible. The first stage of the condensation, which preferably takes place in two stages, may be induced by heating the reaction mixture, although, preferably, a catalyst is added to accelerate the condensation. Suitable catalysts for effecting the initial condensation are the alkaline catalysts, including the hydroxides, carbonates and oxides of the alkali metals and the alkaline earth metals, such as sodium carbonate, sodium bicarbonate, calcium carbonate, caustic soda, slaked lime, magnesia and calcium oxide, the alcoholates of the alkaline metals, such as sodium alcoholate (i. e. of ethyl alcohol, $CH_3CH_2$—O—Na) ammonium hydroxide and the organic bases, such as trimethyl benzyl ammonium hydroxide.

The initial condensation is achieved by mixing the reactants in aqueous solution, preferably in the presence of from one to ten percent of the alkaline catalyst, and heating the mixture at a temperature between 50° C. and the boiling point of the reaction solution. Generally, the aldehyde is used as a 30 to 40 percent solution in water and the solid urea, or other diamide, is dissolved therein to constitute a reaction mass which is a thin liquid. As the reaction proceeds the liquor becomes increasingly more viscous and after a period of from one to four hours the viscosity will have reached approximately 0.55 poise, the solution then containing about 40 to 50 percent solids. In this intermediate state the polymer is stable and may be stored for long periods of time without danger of solidifying.

The liquid intermediate resin may be converted into valuable solid products by heating in the presence of from 1 to 10 percent of a suitable acid catalyst. Useful acid catalysts include the mineral acids, such as sulfuric, hydrochloric, and phosphoric, the organic acids, such as formic, oxalic and chloroacetic acids, the acid gases, such as hydrogen sulfide and sulfur dioxide, the acid salts, such as disodium phosphate zinc chloride, alum, ammonium chloride, aluminum chloride and sodium bisulfate, and in general any substance or mixture of substances, which will yield a hydrogen ion concentration of pH 4 to pH 7. Buffer salt mixtures may be used to maintain the desired pH value, e. g., the McIlvaine buffers. When heated with acid catalysts, the solid condensation production is a thermoplastic, tough, horn-like material, and much less brittle than the conventional diamide-aldehyde resins.

The solid condenastion resins, which separate upon the condensation of an aqueous mixture of reactants, may be fabricated by any of the conventional methods for molding thermoplastic resins. Although conventional urea-formaldehyde type resins when molded become hard and infusible, the resins prepared in accordance with this invention remain thermoplastic, and a plurality of molding operations in sequence may be performed without producing a thermoset product.

The new compositions are also useful for increasing the wet strength of paper. If the conventional urea-formaldehyde type resins are so used the paper becomes unduly stiff or harsh, whereas the use of the modified condensation products produces a soft flexible paper in which the wet strength is increased from about 5 percent of its dry strength to about 40 percent of its dry strength. The new compositions are applied to papers in the form of the intermediate liquid compositions described above by incorporating therein a suitable acid catalyst, such as one of those mentioned above, and dipping the paper in the aqueous solution, and subsequently heating the paper to effect the final condensation of the reactants.

The new compositions are also useful in preparing light-weight, rigid, porous compositions by polymerizing in the presence of a substance, such as sodium bicarbonate, amino-diazobenzene, ammonium oxalate, etc. which decompose to form fixed gases when heated. The same compositions can be prepared by beating air into the liquid resins and polymerizing them in the foamy state. The resulting foam-like compositions have all the desirable properties of the conventional products, and in addition the brittleness is greatly reduced and the tensile strength substantially increased.

Further details of the preparation of the new modified urea-formaldehyde type resins are set forth with respect to the following specific examples.

Example 1

A mixture of 152 cc. of 37 percent aqueous formaldehyde solution, 60 grams of urea and 53 grams of acrylonitrile was placed in a glass reaction flask. With the reaction mixture at 15° C., 25 cc. of 1.8 N sodium hydroxide was slowly added. The heat of reaction increased the temperature to 67° C. in 15 minutes. The temperature was held between 60 and 65° C. by cooling in an ice bath until the reaction subsided, as evidenced by the cessation of heat evolution. The mass was then heated at 100° to 105° C. for 24 hours to form a thermoplastic sticky solid. Further heating for 64 hours produced a hard glassy solid which had a flow temperature of 320° F. on the Tinius-Olsen-Flow testing machine at 1500 lbs. per square inch.

Example 2

A mixture of 608 cc. of 37 percent aqueous formaldehyde, 266 cc. of acrylonitrile and 240 grams of urea was condensed by the addition of 10 cc. of a 25 percent sodium hydroxide solution. During the latter part of the sodium hydroxide addition, the temperature rose to 65° C. where it was maintained by cooling with an ice bath. One hour after the maximum temperature had been reached the reaction temperature subsided and, upon cooling, solid crystals of condensation product separated. The reaction mass was then heated between 90° and 95° C. for three hours at which time the viscosity was about 0.55 poise. This solution was quite stable and was used in the following examples:

Example 3

Four grams of sodium alkyl sulfate was added to 500 cc. water. This solution was frothed by efficient agitation. Thereupon, there was added a 20.5 gram portion of urea, 340 cc. of a 45 percent solution of urea-formaldehyde resin, and a sufficient amount of a solution of the acrylonitrile-modified urea-formaldehyde product as prepared by the method described in Example 2 to give 30 grams of solids. This mass was then further frothed. The product was gelled by the addition of 4 cc. of an 85 percent solution of $H_3PO_4$. The dried product gave a superior modified urea-formaldehyde foam.

Example 4

The product of Example 2 was diluted with water until it contained 5 grams of resin in 500 cc. solution. Unbleached Kraft wrapping paper in sheets, 8 x 15 inches, was dipped in the solution, passed through a pair of rubber rolls, air dried, and finally heated to 100° C. for 2 hours. The paper so treated had a much improved wet strength. It was also less harsh than the usual urea-formaldehyde treated paper.

Example 5

110 grams of the modified urea-formaldehyde from Example 2 was treated with 20 cc. of a 10 percent solution of $AlCl_3$. This solution on standing over night set to a thick gel. The product was then heated at 105° C. for 20 hours. The cooled product was ground to 40 mesh. This was a moldable resin with a flow temperature of 325° F. on the Tinius Olsen Flow testing machine at 1500 p. s. i.

Although the invention has been described with respect to specific embodiments thereof, it is not intended to be limited by the described details, except to the extent incorporated in the following claims.

I claim:

1. A resinous condensation product resulting from the condensation of a mixture consisting of one molecular equivalent of urea and 1.5 to 3 molecular equivalents of formaldehyde and 0.5 to 1.5 molecular equivalents of a compound of the group consisting of acrylonitrile and methacrylonitrile.

2. A resinous condensation product resulting from the condensation of a mixture consisting of one molecular equivalent of urea and 1.25 to 4 molecular equivalents of formaldehyde and from 0.25 to 1.75 molecular equivalents of a compound of the group consisting of acrylonitrile and methacrylonitrile.

3. A method of preparing a resinous condensation product which comprises forming a mixture consisting of one molecular equivalent of urea 1.5 to 3 molecular equivalents of formaldehyde and from 0.5 to 1.5 equivalents of a compound of the group consisting of acrylonitrile and methacrylonitrile in aqueous solution in the presence of an alkaline catalyst capable of condensing urea with formaldehyde, subjecting the mixture to heat until a viscous aqueous solution is obtained, heating the viscous solution until a solid condensation product is formed, and separating the solid condensation product.

4. A method of preparing a resinous condensation product which comprises forming a mixture consisting of one molecular equivalent of urea 1.25 to 4 molecular equivalents of formaldehyde and from 0.25 to 1.75 molecular equivalents of a compound of the group consisting of acrylonitrile and methacrylonitrile in aqueous solution in the presence of an alkaline catalyst capable of condensing urea with formaldehyde, subjecting the mixture to heat until a viscous solution is formed, heating the solution in the presence of an acid catalyst capable of further condensing the viscous solution until a solid condensation product is formed, and separating the solid condensation product.

5. A resinous condensation product resulting from the condensation of a mixture consisting of one molecular equivalent of urea with 1.5 to 3 molecular equivalents of formaldehyde and from 0.5 to 1.5 molecular equivalents of acrylonitrile.

6. A resinous condensation product resulting from the condensation of a mixture consisting of one molecular equivalent of urea with 1.25 to 4 molecular equivalents of formaldehyde and from 0.25 to 1.75 molecular equivalents of acrylonitrile.

7. A method of preparing a resinous condensation product which comprises forming a mixture consisting of one molecular equivalent of urea 1.5 to 3 molecular equivalents of formaldehyde and from 0.5 to 1.5 equivalents of acrylonitrile in aqueous solution in the presence of an alkaline catalyst capable of condensing urea with formaldehyde, subjecting the mixture to heat until a viscous aqueous solution is obtained, heating the viscous solution until a solid condensation product is formed, and separating the solid condensation product.

8. A method of preparing a resinous condensation product which comprises forming a mixture consisting of one molecular equivalent of urea 1.25 to 4 molecular equivalents of formaldehyde and from 0.25 to 1.75 molecular equivalents of acrylonitrile in aqueous solution in the presence of an alkaline catalyst capable of condensing urea with formaldehyde, subjecting the mixture to heat until a viscous solution is formed, heating the solution in the presence of an acid catalyst capable of further condensing the viscous solution until a solid condensation product is formed, and separating the solid condensation product.

JACK D. ROBINSON.

REFERENCES CITED

The following references are of record in the file of this patent:

UNITED STATES PATENTS

| Number | Name | Date |
| --- | --- | --- |
| 2,327,771 | D'Alelio | Aug. 24, 1943 |